T. B. POWERS.
SIGNAL FOR VEHICLES.
APPLICATION FILED AUG. 11, 1919.
1,334,047.
Patented Mar. 16, 1920.
2 SHEETS—SHEET 1.
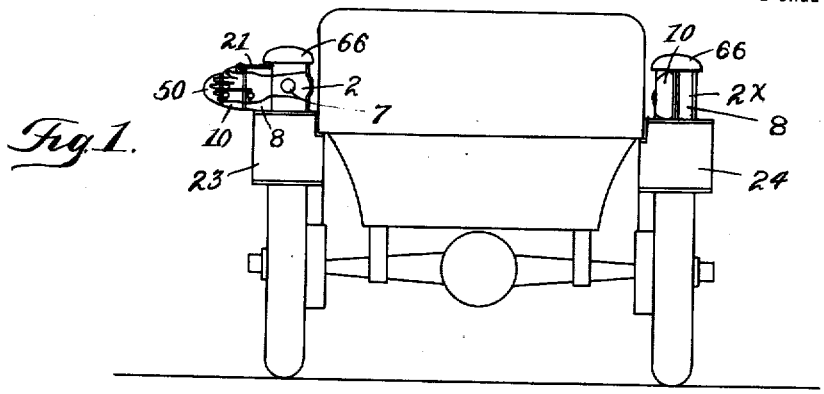
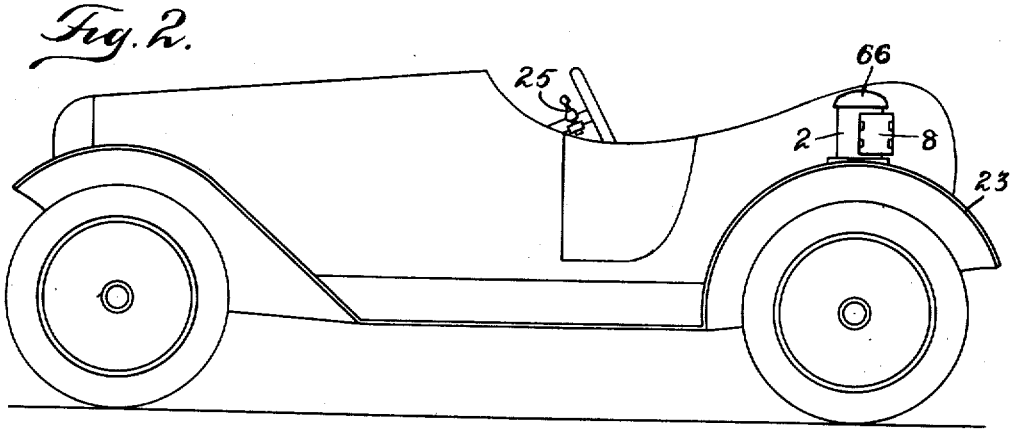
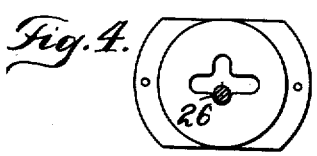
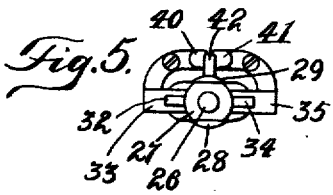
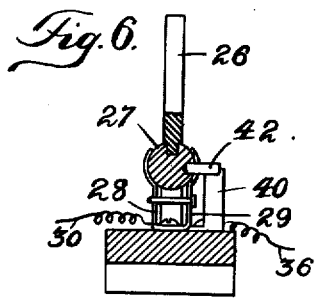
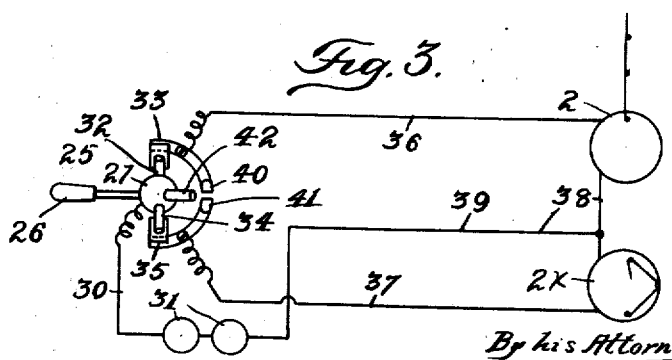
Inventor:
Timothy B. Powers,
By his Attorney
Wm. H. Reid.

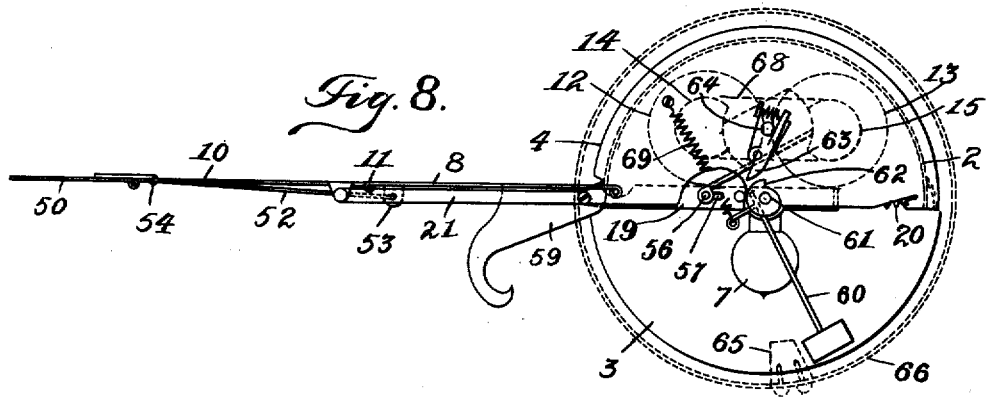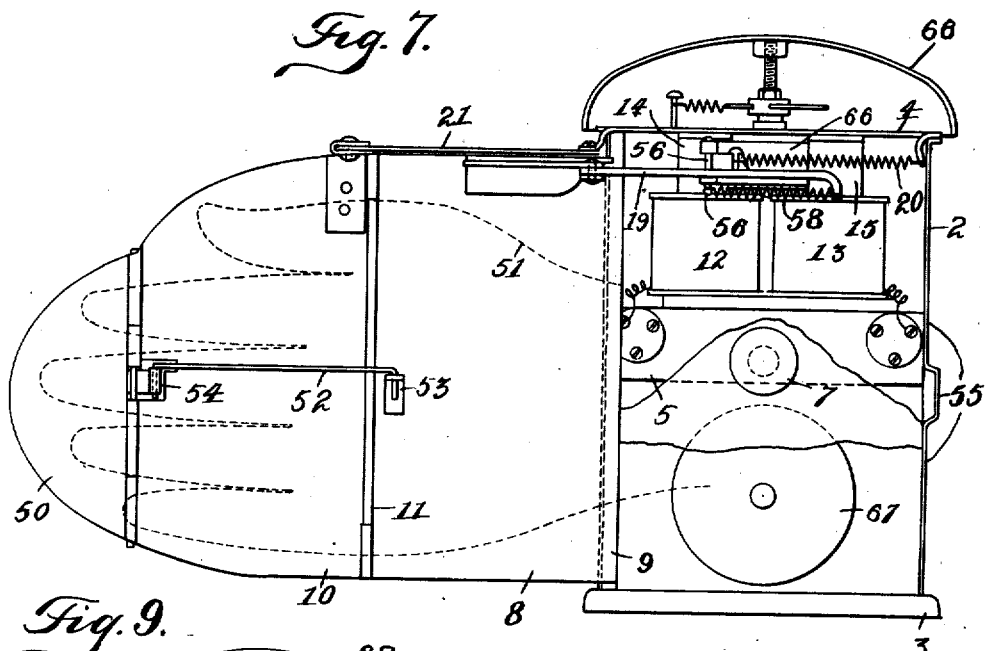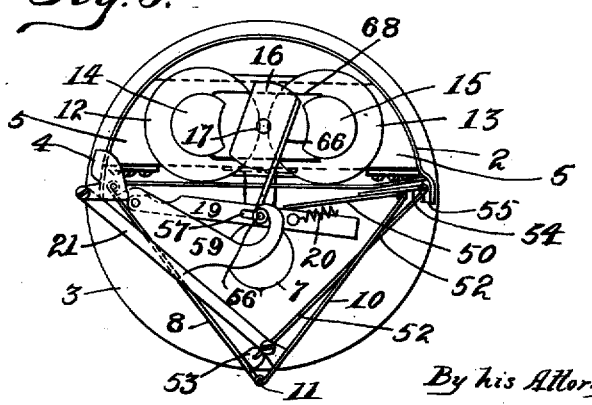

UNITED STATES PATENT OFFICE.

TIMOTHY B. POWERS, OF BROOKLYN, NEW YORK, ASSIGNOR TO JACOB B. BANDER, OF NEW YORK, N. Y.

SIGNAL FOR VEHICLES.

1,334,047.　　　Specification of Letters Patent.　　Patented Mar. 16, 1920.

Application filed August 11, 1919. Serial No. 316,604.

*To all whom it may concern:*

Be it known that I, TIMOTHY B. POWERS, a citizen of the United States, residing at Brooklyn, in the county of Kings and State of New York, have invented certain new and useful Improvements in Signals for Vehicles, of which the following is a specification.

This invention relates to signaling devices particularly adapted to be placed on vehicles, especially of the motor type, that will give a distinctive warning or notification that the driver intends to change his progress, either by turning to the right, or to the left, or by reducing the forward movement, or stopping. Such warning or signals are especially designed for attention of other vehicles that are following, but which signals are also useful in indicating to persons coming from either side, as well as to traffic officers in front of the vehicle, the purpose of the driver to change his progress.

One of the objects of the present invention is to provide an improved signal member, that will project beyond a frame or casing in a conspicuous manner, and is in the nature of jointed parts that will imitate the opening of a hand when projected from the casing; and which members will normally serve to shield a signal light, such as a plain or a red light, and when opened will expose such light to the vehicles following, and will be illuminated by such light.

A further object of this invention is to provide in connection with a pair of signal devices, located on opposite sides of a vehicle, controlling means whereby the operation of a single member will serve to actuate either one of the signals, at the will of the driver, or by a different movement will serve to cause both signals to operate simultaneously; for the purpose of indicating that the vehicle will reduce its speed or stop, and also to illuminate the road at the rear, when backing. In the accompanying drawings illustrating one embodiment of my invention, Figure 1 shows in outline the rear of a motor vehicle, with a signal device on each side.

Fig. 2 is a side elevation indicating one signal device, and the control.

Fig. 3 is a diagram of the circuits from the switch to the two signal devices.

Figs. 4, 5 and 6 show the switch control.

Fig. 7 is a front view of one signal device in the open position.

Fig. 8 is a plan view.

Fig. 9 is a plan view with the top plate broken off.

Each of the signal devices, that are substantially identical, comprises a casing or frame denoted generally by 2, and as shown comprises a circular base 3, and a top plate 4. A brace plate 5 is secured at the intermediate part of the body, and may be of suitable insulating material, such as wood or fiber, and serves to support a lamp base for carrying a small electric lamp 7 extending forward. This plate also serves to carry terminals for the electric members.

A jointed signal member is attached to the casing, shown in the form of a plate 8 hinged at 9 to one side of the casing plate 2. A second plate 10 is hinged at 11 to the outer free edge of the plate 8. These two plates are adapted to be swung from a position projecting outwardly in alinement and parallel with the two vertical edges of the body plate 2, to a folded or angular position in which they will extend around the lamp and practically close the exposed rear of the casing, as indicated in Fig. 9. In this position the lamp 7, that is plain or red, is obscured by these two plates; but when the plates are swung outward to the position indicated in Fig. 8 at the left, not only will the light be exposed, but these plates will be illuminated by this light. It is to be understood that any suitable legend may be inscribed on these plates such as the words, "Look Out," or "Turn."

Suitable means are provided for quickly shifting the jointed member from the closed position to the open position. As shown I provide electro-magnetic means, that can be actuated from the usual storage battery or other sort of current on the vehicle. From the top plate 4, I suspend a pair of field magnets 12 and 13 having pole pieces 14, 15. An armature 16 swings on a pivot 17, on a brass plate 68 on the magnets. A link 19 connects the armature arm 66 with the swinging plate 8, and which is so arranged that the armature is in a position transverse to the field when the plate 8 is in the closed position, and on energizing the magnets, the armature will be drawn to a position parallel with the field, which will swing the plate 8 to the open position projecting beyond the casing, as indicated in Fig. 7. A coil spring 20 connects between the armature link and the body member, and serves to retract the armature when the magnets are deënergized, and also acts to swing the plate 8 back to the closed position.

The outer swinging plate 10 connects with the casing by a link 21, that will cause the plate 10 to project outwardly from the plate 8 in the open position, and when the plate 8 is swung in toward the casing, this link will swing the plate 10 on the plate 8, and cause it to assume an angular position relative to the plate 8 adjacent the casing.

I also provide a third plate 50 hinged to the outer edge of the swinging plate 10 of much smaller size than the other plates. These plates may have the representation of a hand 51 painted thereon, as indicated in Fig. 7. A link 52 has one end pivoted at 53 to the plate 8, the other end of this link being pivoted to a lug 54 on the third plate 50. By this means when the plates 8 and 10 are swung inwardly by the armature, the plate 50 will also swing inwardly to the position indicated in Fig. 9, the link 52 causing this third plate to swing in and out, as shown. It will be observed from Fig. 9 that when the plates swing inwardly they will inclose the lamp 7, and will lie adjacent the rear margins of the top and bottom members 3 and 4, as shown. The casing 2 is given an extension 55 that will project a short distance beyond the hinge of the third plate, see Fig. 9. This would prevent persons from engaging the hinge portion and trying to pull the plates outward.

I further provide locking means to prevent the plates being opened from the closed position, except on operation of the armature by the magnets. The arm 66 on the armature is provided with a stud 56 that projects through a slot 57 in the link 19. A coil spring 58 connects this stud 56 with the extremity of the link 19, see Fig. 7, and serves to hold the stud at one end of the slot, as shown. A latch plate 59 is secured to the swinging plate 8, and in the closed position is engaged by the stud 56 as shown in Fig. 9. This will prevent the plate 8 from swinging outwardly, but when the armature first swings the stud 56 will shift in the slot in the link 19, against the force of the spring 58. This will release the catch 59, and when the stud reaches the other end of this slot, it will shift the link 19 to swing the plates to the open position. The catch will automatically reëngage by its beveled end when the spring 20 returns the plates to the closed position.

It is customary in such devices to provide an audible signal, and I arrange a bell to be tripped by the armature. A hammer 60 with spring 69 swings on a pivot 61 and a lug 62 is engaged by a spring pawl 63 mounted on the upper extension of the shaft 64 of the armature. As the armature is swung to open the plates the spring pawl 63 will trip the hammer 60, that will strike a lug 65 on a bell 66 on top of the casing 2. But if preferred an electric bell 67 may be arranged in the casing in circuit with the magnets 12 and 13 that will be operated when the magnets are energized.

As shown in Figs. 1 and 2, I preferably locate one of these signal devices, as set forth, on each of the rear mud guards, 23, 24, and the jointed member is arranged to swing outwardly from the side of the vehicle, as indicated. But obviously these may be placed in any other position on the vehicle, and a pair could be placed at the front at each side to indicate to the traffic officer the direction in which the driver desired to turn.

I further provide a control device for operating either one, or both of the signal members, 2 or 2ˣ, shown in the form of a switch 25, comprising a lever or arm 26 extending from a ball 27. This ball is mounted in cup portions of arms 28 and 29 to have a universal movement therein; which arms connect with one wire 30 from a source of current or battery 31. The lever 26 carries a terminal pin 32 that when the lever is swung to one side, will engage a terminal plate 33. On the opposite side the switch lever carries a terminal pin 34, that when the lever is swung in this direction, will engage a terminal plate 35. These terminals 33 and 35 connect respectively with the signal members 2, and 2ˣ, that is with their electro-magnets, by wires 36 and 37. Wires 38 and 39 lead from the two signal members back to the battery at 31.

A third terminal plate 40 is connected with the said terminal 33; and another terminal 41 is connected with the said terminal plate 35, and these two plates are arranged adjacent but out of contact. They are so positioned as to be engaged by a terminal pin 42 on the switch lever 26 when the lever is swung in a third direction. This will bridge these terminals 40 and 41, and therefore cause the electro-magnets in both of the signal devices 2 and 2ˣ to be in circuit with the current supply at 31. Therefore both of the signal devices will operate, and the vehicles at the rear will understand that this vehicle intends to reduce speed, or stop.

It will be understood that each of the signal devices is provided with a light, and that this form of switch in one position will cause both lamps to be lighted. This serves a special purpose of illuminating the road at night when it is desired to back the vehicle, and the use of both lamps is very effective for this purpose.

What I claim is:—

1. In a signaling apparatus, a casing, a lamp projecting from the casing, a plate hinged to one side of the casing, a plate hinged to the outer edge of said plate whereby said plates can project outwardly in alinement and can fold inwardly to the casing around the lamp, and actuating means on the casing connected with said two plates arranged to shift them to said two positions.

2. In a signal device, a casing, a lamp projecting from the casing, a plate hinged to one side of the casing rear wall, a plate hinged to the outer edge of said plate, whereby said two plates can swing outwardly into alinement with said rear wall, and swing inwardly to an angular position against said rear wall of the casing and around the lamp, and actuating means connected with said two plates arranged to swing them to said two positions.

3. In a signaling apparatus, a casing, a plate hinged to one side of the casing, an actuating member connected with the plate to cause it to swing out of the casing and to retract it, a plate hinged to the outer edge of said plate, a link pivoted between the second plate and the casing, whereby when the first plate is swung outward the second plate will swing outward to a position in alinement with the first plate, and when the first plate is swung back to the casing the second plate will be swung to a position adjacent the casing, and a lamp on the rear of the casing normally surrounded and obscured by the two plates but exposed when the plates are swung outward into alinement.

4. In a signaling apparatus, a casing, a plate hinged to one side of the casing, an actuating member connected with the plate to cause it to swing out of the casing and to retract it, a plate hinged to the outer edge of said plate, a link pivoted between the second plate and the casing, whereby when the first plate is swung outward the second plate will swing outward to a position in alinement with the first plate, and when the first plate is swung back to the casing the second plate will be swung to a position adjacent the casing, and a lamp on the rear of the casing normally surrounded and obscured by the two plates but exposed when the plates are swung outward into alinement in which exposed position the plates are illuminated by the lamp.

5. In a signaling apparatus, a casing, a plate hinged to one side of the casing, an actuating member connected with the plate to cause it to swing out of the casing and to retract it, a plate hinged to the outer edge of said plate, a link pivoted between the second plate and the casing, whereby when the first plate is swung outward the second plate will swing outward to a position in alinement with the first plate, and when the first plate is swung back to the casing the second plate will be swung to a position adjacent the casing.

6. In a signaling apparatus, a casing, a plate hinged to one side of the casing, a second plate hinged to the outer edge of said plate, a link pivoted between the second plate and the casing whereby when the first plate is swung outward the second plate will swing outward to a position in alinement with the first plate and when the first plate is swung back to the casing the second plate will be swung to a position adjacent the casing, an electro-magnet in the casing, an armature arranged to swing in the field of the magnet, a link connecting the armature with the first plate arranged to swing the plates outward, and a spring arranged to retract the armature and said plates.

7. In a signaling apparatus, a casing, a plate hinged to one side of the casing, an actuating member connected with the plate to shift it to project out from the casing and to retract it, a second plate hinged to the outer edge of said plate, a link pivoted between the second plate and the casing, whereby when the first plate is swung outward the second plate will be swung outward to a position in alinement with the first plate, and when the first plate is swung back to the casing the second plate will be swung to a position adjacent the casing, and a catch to lock the plates at the casing that is released by the actuating means.

8. In a signaling apparatus, a casing, a lamp projecting from the rear wall of the casing, a plate hinged vertically to one side of the casing to swing out from the casing whereby said plate can project outwardly and can fold inwardly to conceal said lamp, an electro-magnet in the casing, an armature for said magnet, an arm fast on said armature, a pin on said arm, a link pivoted to said plate and having a slot at which portion it engages said pin, whereby when the armature moves it will first have the pin travel free in the link slot and thereupon will shift the link to swing the said plate, and a catch on said plate engaging said pin until the arm moves the pin in said link slot to normally lock the plate in closed position.

9. In a signaling apparatus, a casing, a plate hinged to one side of the casing, a second plate hinged to the outer portion of said plate, a link pivoted between the second plate and the casing whereby when the first plate is swung outward the second plate will swing outward to a position in alinement with the first plate and when the first plate is swung back to the casing the second plate will be swung to a position adjacent the casing, an electro-magnet in the casing, an armature arranged to swing in the field of the magnet, a link connecting the armature with the first plate arranged to swing the plates outward, a spring arranged to retract the armature and said plates, a bell, and a hammer engaged by the armature to be tripped when the plates are swung thereby.

10. In a signaling device, a casing, a plate hinged to one side of the casing, a second plate hinged to the outer edge of said plate, a third plate hinged to the outer edge of the second plate, actuating means connected with the first plate to swing it toward and from the casing, a link pivoted between the second plate and the casing, and a link pivoted between the third plate and the first plate, whereby when the first plate is swung outward the other two plates will be swung outward into alinement therewith, and when the first plate is swung in toward the casing the said other two plates will swing inward adjacent the casing.

11. In a signaling device, a casing, a plate hinged to one side of the casing, a second plate hinged to the outer edge of said plate, a third plate hinged to the outer edge of the second plate, a lamp on the casing, actuating means connected with the first plate to swing it toward and from the casing, a link pivoted between the second plate and the casing, and a link pivoted between the third plate and the first plate, whereby when the first plate is swung outward the other two plates will be swung outward into alinement therewith, and when the first plate is swung in toward the casing the said other two plates will swing inward and serve to surround and conceal the lamp.

12. In a signaling device, a casing, a plate hinged to one side of the casing, a second plate hinged to the outer edge of said plate, a third plate hinged to the outer edge of the second plate, an electromagnet connected with the first plate to swing it out from the casing, a spring arranged to swing the plate in adjacent the casing, a link pivoted between the second plate and the casing, and a link pivoted between the third plate and the first plate, whereby when the first plate is swung outward the other two plates will be swung outward into alinement therewith, and when the first plate is swung in toward the casing by the spring the said other two plates will swing inward adjacent the casing.

13. In a signaling device, a casing, a plate hinged to one side of the casing, a second plate hinged to the outer edge of said plate, a third plate hinged to the outer edge of the second plate, a lamp on the casing, an electro-magnet connected with the first plate to swing it out from the casing, a spring arranged to swing the plate in adjacent the casing, a link pivoted between the second plate and the casing, and a link pivoted between the third plate and the first plate, whereby when the first plate is swung outward the other two plates will be swung outward into alinement therewith, and when the first plate is swung in toward the casing by the spring the said other two plates will swing inward and serve to surround and conceal the lamp.

14. In a signal device, a casing provided with a rear wall, and with a top wall and a bottom wall that both extend rearwardly beyond said rear wall of the casing, a lamp projecting from the casing, a plate hinged to one side of the casing, a plate hinged to the outer edge of said plate, said two plates being arranged to swing outwardly into alinement with said rear wall of the casing, and to swing inwardly to a position angular to said rear wall around said lamp, in which latter position said top and bottom wall extensions project beyond and protect the top and bottom edges of said two swinging plates and inclose the lamp.

15. In a signal device, a casing provided with a rear wall, and with a top wall and a bottom wall that both extend rearwardly beyond said rear wall of the casing, a lamp projecting from the casing, a plate hinged to one side of the casing, a plate hinged to the outer edge of said plate, said two plates being arranged to swing outwardly into alinement with said rear wall of the casing, and to swing inwardly to a position angular to said rear wall to conceal said lamp, in which latter position said top and bottom wall extensions project beyond and protect the top and bottom edges of said two swinging plates and inclose the lamp, one side edge of the casing being extended beyond said rear wall, the free edge of said outer swinging plate in the folded position being located inside of the said extended edge.

Signed at New York city, N. Y., on August 8th, 1919.

TIMOTHY B. POWERS.